S. B. HAZARD.
TONGUE TRUCK.
APPLICATION FILED AUG. 24, 1911.
1,099,088.
Patented June 2, 1914.
4 SHEETS—SHEET 1.
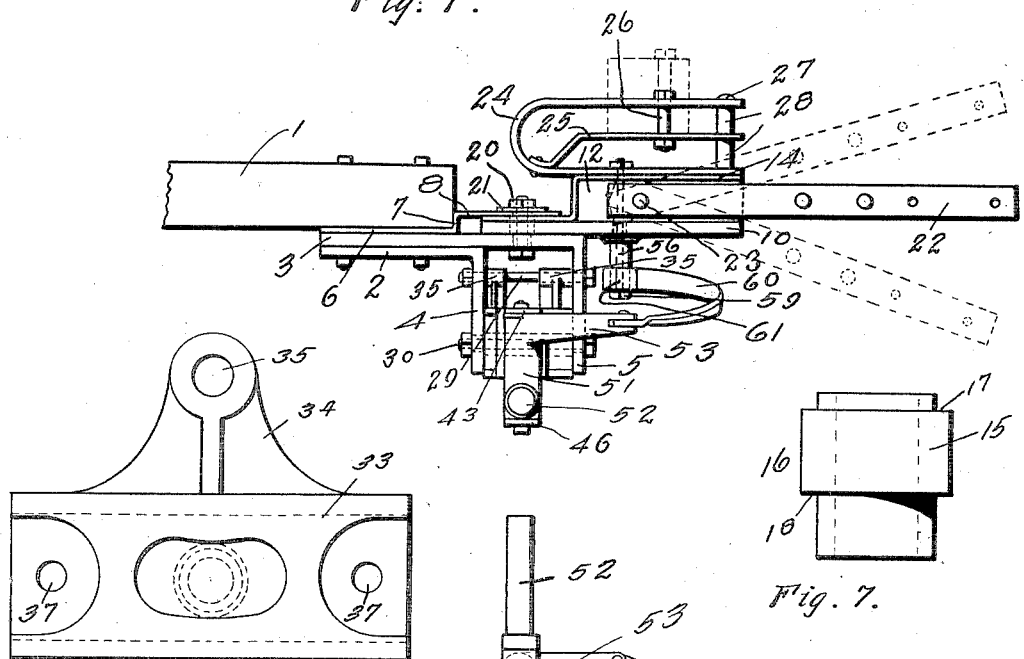
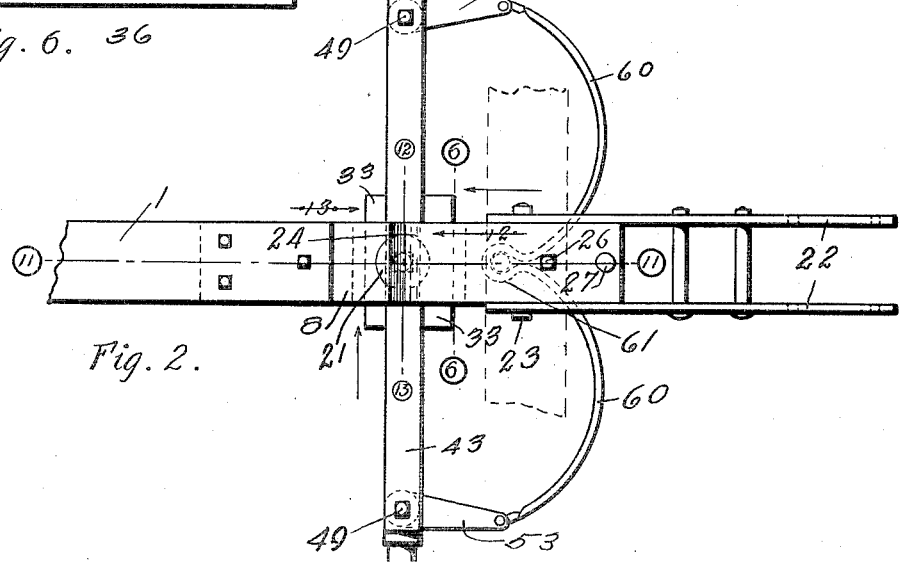
WITNESSES.
J. W. Naylor.
E. M. Barnhardt
INVENTOR.
Samuel B. Hazard
By La Porte & Bean
Attys.

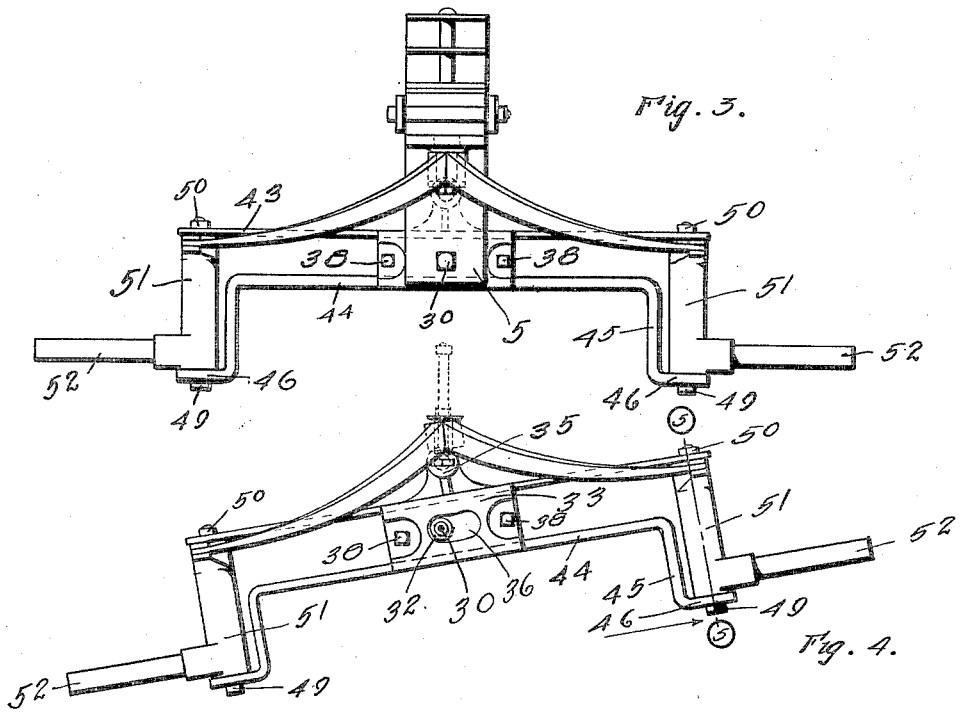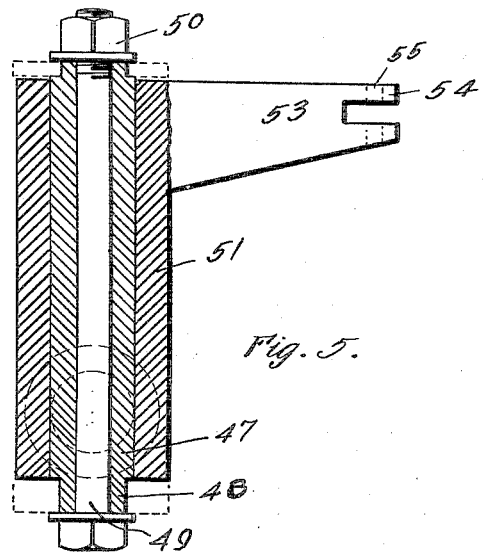

S. B. HAZARD.
TONGUE TRUCK.
APPLICATION FILED AUG. 24, 1911.

1,099,088.

Patented June 2, 1914.
4 SHEETS—SHEET 3.

S. B. HAZARD.
TONGUE TRUCK.
APPLICATION FILED AUG. 24, 1911.

1,099,088.

Patented June 2, 1914.

4 SHEETS—SHEET 4.

WITNESSES.
J. W. Naylor.
E. M. Barnhardt

INVENTOR.
Samuel B. Hazard
By LaPorte & Bean
Attys.

UNITED STATES PATENT OFFICE.

SAMUEL B. HAZARD, OF PEORIA, ILLINOIS.

TONGUE-TRUCK.

1,099,088.　　　　Specification of Letters Patent.　　Patented June 2, 1914.

Application filed August 24, 1911. Serial No. 645,765.

*To all whom it may concern:*

Be it known that I, SAMUEL B. HAZARD, a citizen of the United States, residing at Peoria, in the county of Peoria and State of Illinois, have invented certain new and useful Improvements in Tongue-Trucks, of which the following is a specification.

This invention relates to improvements in tongue trucks, particularly for use in connection with agricultural implements of various kinds, and has for its object the provision of a truck of the character described, which may be readily adapted to and utilized with almost any agricultural implement from a disk harrow to a harvester and binder.

Another object of the invention is the provision of a device of the character described, wherein the steering member and the axles of the truck are connected by a yielding or resilient steering connection for the purpose of obviating the danger of breaking due to undue strain.

A further object of the invention is the provision of a device of the character described which prevents skidding of the wheels, which may be readily turned sharply at an angle of 90 degrees and more to the line of draft without coming to a dead center, and may be readily returned back to its normal position; the device also guides the implement exactly so that an even and straight line is maintained by whatever character of machine or implement it is used in connection with.

To the accomplishment of the foregoing and such other objects as may hereinafter appear my invention consists in the construction, combination and arrangement of parts hereinafter described and then sought to be defined in the appended claims, reference being had to the accompanying drawings forming a part hereof, it being understood that these drawings represent a preferred embodiment of my invention for the purpose of illustrative disclosure, but that the practical details and construction of my device may be varied within the limit and scope of the claims without digressing from my inventive idea.

Figure 8:
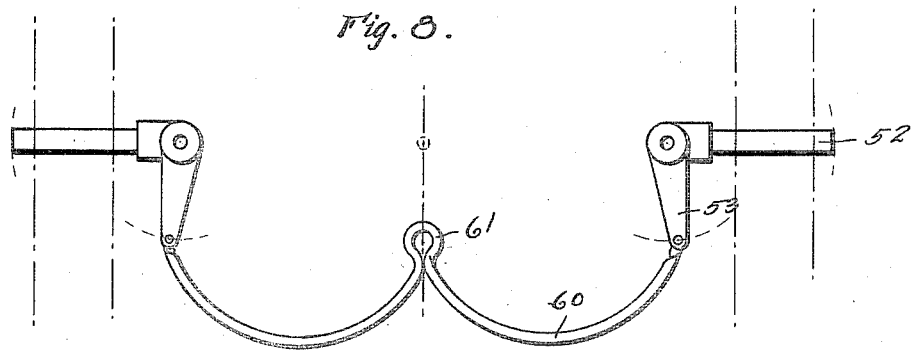
Figure 9:
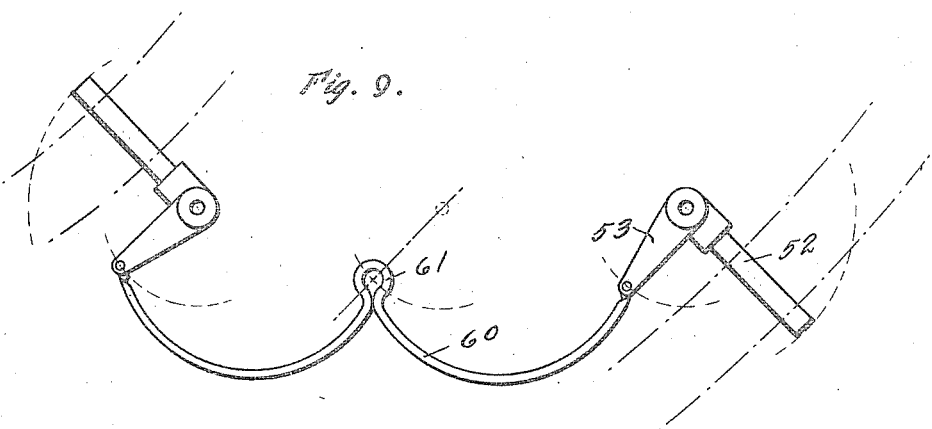
Figure 10:
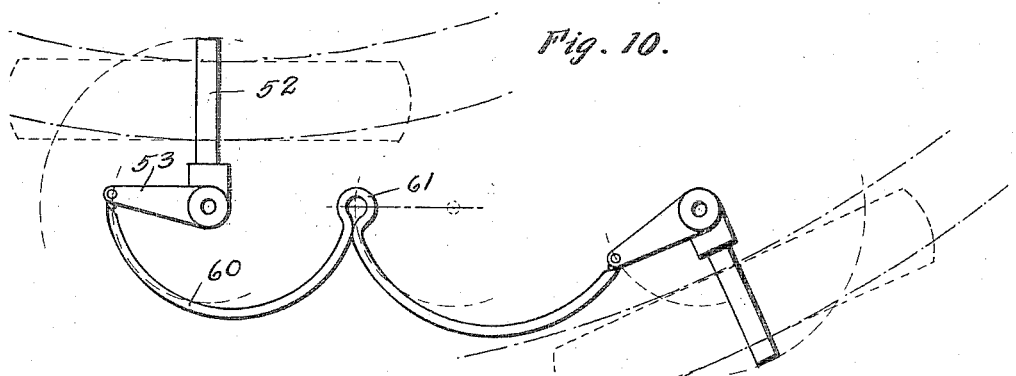
Figure 11:
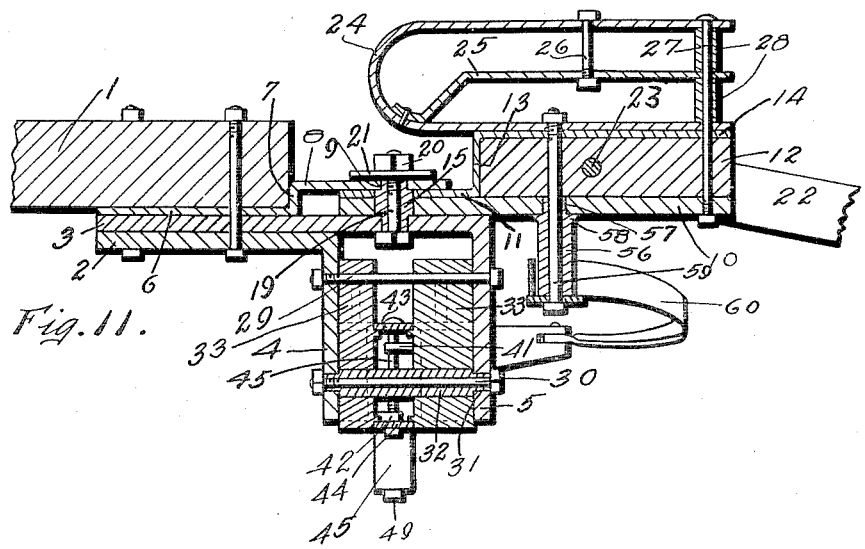
Figure 12:
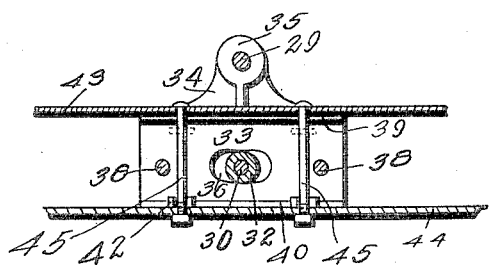
Figure 13:
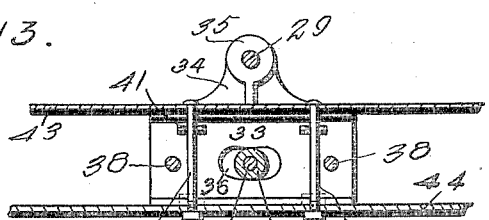

In the drawings, Figure 1 is a side elevation of my improved truck assembled. Fig. 2 is a top plan view thereof. Fig. 3 is a front view thereof in normal horizontal position. Fig. 4 is a front view of the truck showing the axles and their supports oscillated about the horizontal pivot, parts being removed. Fig. 5 is a cross section of a detail taken substantially on line 5—5 of Fig. 4. Fig. 6 is a view of a detail, taken substantially on line 6—6 of Fig. 2 and looking in the direction of the arrow. Fig. 7 is a view of a detail. Figs. 8, 9 and 10 are diagrammatic views of the axles and the connecting spring member showing them in three different positions. Fig. 11 is a cross section taken substantially on line 11—11 of Fig. 2. Fig. 12 is a detail section taken substantially on line 12—13 looking in the direction of the arrow 12. Fig. 13 is a detail section taken substantially on line 12—13 looking in the direction of the arrow 13.

In the various views of the drawings, like characters of reference designate corresponding parts.

No attempt has been made to illustrate any particular form of agricultural implement or machine to be used in connection with my truck, as I desire it to be understood that it may be used with practically any implement or machine the operator desires. Therefore, the stub tongue 1 of an implement is the only part thereof that is shown. To this tongue are connected the supporting members for the tongue truck which comprise angled bars or plates 2 and 3, the latter having a horizontally extending portion considerably longer than that of the former. The downward vertical extensions 4 and 5 of these plates or bars are spaced apart to provide room for the axle and its supporting and mounting means which is disposed therebetween, and which will be described hereinafter.

The mounting and connection of the steering member to the stub tongue will now be described.

The plate 3, as is seen, is positioned above plate 2, and, between plate 3 and the stub tongue 1, is positioned the bar or plate 6, which is formed with a vertical right angled portion 7 bearing against the end of the stub tongue 1, and having extending therefrom the horizontal portion 8, which has an opening 9 formed therein for a purpose to be described. A straight bar or plate 10 is positioned over the outer portion of plate or bar 3, between it and a plate or bar 11, which is placed immediately under the horizontal extension 8 of plate or bar 6. The member 10 extends to form a support for the block 12. The plate or bar 11 has the right angled vertically extending portion 13 abutting one end of said block 12 and the horizontal extension 14 extending along the top of said block. The plates, bars or members 3, 10 and 11, all have openings formed therein to fit the spacing thimble or sleeve 15, which is illustrated in detail in Fig. 7, and has the enlarged boss 16 forming the shoulders or flanges 17 and 18. The horizontal extension 8 of the bar 6 bears on the shoulder 17 and the plate or bar 3 bears and rests on the shoulder 18. This thimble or sleeve 15 is bored centrally to receive the bolt 19 and the parts are held together by means of the nut 20 which bears on washer 21. The plates 22 are connected on opposite sides of the block 12 by means of the bolt or pivot pin 23 so that the tongue which is mounted between said plates may be raised and lowered as desired as indicated in dotted lines in Fig. 1.

Mounted on top of the horizontal extension 14 of plate 11 which rests on top of the block 12, is the device to which the draft means are adapted to be connected. This comprises a U shaped member 24 positioned on one of its sides on the horizontal extension 14 of bar or plate 11, having a horizontally extending member 25 secured to the loop and extending intermediately between the two horizontal portions thereof. This member 25 is connected to the upper part of said U shaped member 24 by means of bolt 26 to which a suitable draft means may be connected. A long bolt 27 passes through the bar or plate 10, block 12, horizontal extension 14 of plate or bar 11, the two horizontal extensions of the U-shaped member 24, and the intermediate member 25, spacing sleeves or thimbles 28 being provided between the horizontal portions of member 24 and the intermediate plate or bar 25. The draft means is therefore mounted on the block 12 and not on the pivoted steering tongue so that the weight thereof is removed therefrom.

The supporting bar or member 10 provides a steering member and the draft means is mounted on this steering member, the tongue being pivoted to said steering member but free from the weight of the draft means. By using the spacing sleeve or thimble 15 the connection between the steering member 10 and the stub tongue may be adjusted tightly to prevent any lost motion and noise and at the same time the parts will not bind to prevent the free movement of the steering member and its connections about the vertical pivot formed by the bolt 19.

The block 12 which supports the tongue and the device to which the draft means is attached is connected indirectly with the stub-axles of the truck which have a swivel connection with the axle proper, whereby, when the steering truck is turned to change the line of draft, the wheels of the truck will be turned correspondingly. This will all be described later but attention will now be called to the particular manner of mounting and securing the axle. As stated before, the vertical extensions 4 and 5 of the plates, bars, or members 2 and 3 are disposed oppositely to each other and spaced apart. These extensions 4 and 5 have a bolt 29 connecting them near their upper part and a bolt 30 connecting them near their lower extremity, openings being formed in said extensions for the reception of said bolts. It is to be noted that the openings formed in said extensions for the lower bolt are somewhat larger than the bolt in order to receive the reduced ends 31 of the spacing sleeve or thimble 32, the extensions bearing against the shoulders on said thimble formed by reducing the ends. Pivotally mounted on the upper bolt 29 is the axle proper which comprises the members or castings 33 which are of substantially rectangular shape, having an extended boss or projection 34 on the top which is formed with a sleeve or bearing 35 for the reception of said bolt 29. In said members 33 directly below the bearing or sleeve 35 are formed the arcuate slots 36 large enough to slidably receive the spacing thimble or sleeve 32 of the lower bolt 30. These members are also provided with the bolt holes 37 through which pass the securing bolts 38. Extending inwardly from the inner face of each casting or member 33 are the upper and lower flanges or ribs 39 and 40, and also the lugs or projections 41 and 42. It is to be understood that the two castings or members 33 correspond in detail, shape and form, but are placed in opposite positions relative to each other. On the opposed upper flanges or ribs 39 is positioned the horizontally extending bar or plate 43 and beneath the lower ribs or flanges 40 is placed the bar or plate 44, these two plates being held together by means of the bolts 45, which, as shown, extend between the lugs or projections 41, 42 and thus bind the members together against separate movement relative to each other in any direction. This construction forms the entire axle proper, which is thus mounted for vertical oscillation and at the same time secured against any horizontal movement or oscillation whatever.

The stub axles for the wheels of the truck are mounted on the bars or plates 43 and 44 of the axle proper, the latter of which is provided at its end portions with the downward vertical extensions 45 having the extremities thereof turned at right angles to provide horizontal extremital portions 46. These extremital portions, as well as the end portions of plate or bar 43, are bored to receive thimbles or spacing sleeves 47 which have reduced ends 48, bolts 49 being received in said sleeves or thimbles and having nuts 50 at their upper ends. Mounted on these sleeves or thimbles 47 are the sleeves or cylindrical members 51 which have as right angled horizontal extensions, the stub-axles 52 which support the wheels of the truck. These stub-axles are preferably formed near the lower extremities of said sleeves 51, while near the upper extremities thereof are provided the arms or extensions 53 which project at right angles to said sleeves and at approximately right angles to vertical planes passing through said stub-axles. The ends of these arms or extensions are bifurcated as at 54 and have the openings 55 bored therethrough for a purpose to be described. It is to be noted that the bolts 49, sleeves 47 and plates or bars 43 and 44 may be rigidly connected together and no lost motion allowed, while at the same time undue binding and friction is prevented because of the utilization of the spacing sleeves or thimbles 47 which prevent the bolt heads, nuts and bar 43 from engaging the sleeves 51 which support the stub-axles and which rotate on said bolts and spacing sleeves or thimbles 47. It is here seen that I have provided stub-axles having swiveled connection with the axle proper whereby they turn about a vertical pivot on said axle proper.

As stated above the stub-axles are connected with the block 12, so that, when the steering member, which is connected thereto, is turned, the stub-axles and wheels will turn. This steering connection is of peculiar form and is one of the principal characteristics which distinguish my invention. A spool or thimble 56 having a reduced end 57 and a shoulder or flange 58 is placed below the bar or plate 10 with the reduced end thereof entering an opening in said bar and the shoulder 58 bearing against said bar, the parts being held together by a bolt 59, a washer being provided at the lower end between the bolt head and the thimble or spool to support the spring bar or member 60, which forms the yielding steering connection between the steering member and stub-axles. This spring bar or member is made of material of suitable resiliency in the form of a double curve, that is having two portions made on the arcs of circles. These two portions contact and are connected by a circular loop or eye 61 which is positioned about said sleeve or thimble 56 and rests on the washer. The extremities of this spring bar or member are flattened and reduced and interposed between the bifurcated ends 54 of the arms or extensions 53 formed on the sleeves 51 on which sleeves the axles are formed. Bolts or rivets pass through these bifurcated end portions and the extremities of said spring bar or member 60. As shown in Figs. 1 and 11, and also 3 and 4, it is to be further noted that the curved portions of the spring bar or member, each extend downwardly from the central loop or eye 61 toward its extremity. The loop or eye 61 is of sufficient size so that it may turn on the spool or thimble 56. This member 60 being made yielding, relieves all parts of unnecessary strain and obviates the danger of breaking the connections.

Observing Figs. 8 to 10 particularly, it will be seen that the arms or extensions 53 do not extend in planes which are at exact right angles to vertical planes passing through the axles 52 so that the angles as formed between the arms or extensions 53 and the axles 52, as seen in Figs. 8 to 10, are acute angles of slightly less than 90 degrees. The reason for this arrangement may be readily seen by referring to Figs. 9 and 10 and particularly the latter. When turning a very sharp corner, the center on which the machine turns is nearer the wheel indicated on the left than the one on the right in Fig. 10, so that, in order that the machine to which the truck is attached may turn properly, the wheels should move in the arcs of circles having different radii. The wheel to the right therefore moves in the arc of a circle having the longer radius. By this arrangement the machine may properly turn very sharp corners. In addition to the above advantage derived from this arrangement, it is found that the device may always be turned back, so that the machine to which it is attached may assume its normal line of draft without any danger of the spring member and the arms or extensions 53 getting on a dead center. This would certainly be the case were a straight member used in place of the peculiarly formed curved, resilient or yielding connection 60. By using this feature, the wheels may be turned through an arc of more than 90 degrees, that is, if the remaining structure of the truck will permit it.

It will be noted as shown in Fig. 10, that the curved member 60 is subjected to a slight compression in its left hand curved portion and to a correspondingly slight extension or expansion in its right hand curved portion, this being due to the different relative positions of the center of the pivot pins or bolts, about which the axles rotate, and the bifurcated ends of the arms or extensions 53 as compared to the spool or thimble 56 about which the loop or eye 61 fits. This action of the spring member 60 assists in the operations above set forth and is a material factor in giving the device those advantages. Further, as seen by referring particularly to Figs. 3 and 4, the axle, stub-axles and wheels and their supporting structure have an independent vertical movement or oscillation about a horizontally arranged pivot pin or bolt. As stated hereinbefore, the stub-axles 52, and the axle, comprising the bars 43 and 44 and the members to which they are attached, are all rigidly secured together between the downward vertical extensions 4 and 5 of the bars or plates 2 and 3, and, in view of the arcuate slots 36 in the members or castings 33, these members or castings, together with the bars 43 and 44 and the stub-axles, have a limited path of movement for oscillation about the bolt 30 and the spacing sleeve 32. Obviously this provides a means whereby the truck may accommodate itself to inequalities in the surface over which the truck is being run and also allows it to be utilized on hilly ground. This connection is so made that there is absolutely no horizontal movement or oscillation.

I have, therefore, provided, as is well understood from a consideration of the various details of construction, the arrangement of the parts and their operation as set forth therein, a device of general adaptability and utility in connection with all kinds of farm implements and machines. This device is absolutely non-skidding and is rendered so by the structural arrangement, which even obviates the necessity of the use of flanged or other form of non-skidding wheels. It may also be turned through very sharp corners in a little space without any danger of the parts locking owing to their resting at a dead center. Further than that, owing to the yielding steering connection I have provided, the parts will be relieved of all sudden strains and jerks in turning and owing to the peculiar form of said connecting member the steering member of the truck may be turned through an angle of 90 degrees or more without any danger of the parts locking or coming to a dead center to prevent their return to a normal position. The tongue is merely provided to prevent the implement from running up on the horses and in order to provide a means whereby they may hold back in going down hill. All of the draft pull is on the steering member 10 and any change in direction is caused by the movement of that steering member about its pivot and the consequent movement of the stub axles which are connected with said steering member.

Attention is here called to the fact that the draft devices are merely indicated by dotted lines, particularly in Figs. 1 and 2 and that if such draft devices are used in connection with a binder they will be connected on the top of the member 24, see dotted lines, Fig. 1, and if such draft devices are used in connection with a disk they will be supported between the member 24 and the plate or bar 25, see dotted lines, Fig. 1.

This device is simple in construction, exceedingly efficient in operation, cheap to manufacture and constitutes a very material advance in the art.

What I claim is:—

1. A truck for agricultural implements, comprising an axle, means supporting the axle adapted to be connected to an implement, stub axles connected to said axle, a steering member, and a normally rigid steering connection between said steering member and said stub axles, said steering connection being resilient in the act of turning and adapted to expand and contract under such conditions.

2. A truck for agricultural implements, comprising an axle, means supporting the axle adapted to be connected to an implement, stub axles connected to said axle, a steering member, and a normally rigid curved steering connection between said steering member and said stub axles, said steering connection being resilient in the act of turning and adapted to expand and contract under such conditions.

3. A truck for agricultural implements, comprising an axle, means supporting the axle adapted to be connected to an implement, stub axles connected to the extremital portions of said axle, a steering member, and a normally rigid steering connection between said steering member and said stub axles, said steering connection being resilient in the act of turning and adapted to expand and contract under such conditions.

4. A truck for agricultural implements, comprising an axle, means supporting the axle adapted to be connected to an implement, stub axles connected to said axle, a steering member, and a normally rigid steering connection between said steering member and said stub axles, said steering connection comprising a member formed with a double curve, said steering connection being resilient in the act of turning and adapted to expand and contract under such conditions.

5. A truck for agricultural implements, comprising an axle, means supporting the axle adapted to be connected to an implement, stub axles connected to said axle, a steering member, and a normally rigid steering connection between said steering member and said stub axles, said steering connection comprising a member formed with a double curve connected intermediate its ends to said steering member, and at its ends to said stub axles, said member being yielding in the act of turning.

6. A truck for agricultural implements, comprising an axle, means supporting the axle adapted to be connected to an implement, stub axles connected to said axle, a steering member, and a normally rigid steering connection between said steering member and said stub axles, said steering connection comprising a member formed with a double curve connected intermediate its ends to said steering member and at its ends to the opposite ends of said stub axles, said member being yielding in the act of turning.

7. A truck for agricultural implements, comprising an axle, means supporting the axle adapted to be connected to an implement, stub axles connected to said axle, a steering member, and a steering connection between said steering member and said stub axles, comprising a downwardly curved member connected to both said steering member and said stub axles, said member being yielding in the act of turning.

8. A truck for agricultural implements, comprising an axle, means supporting the axle adapted to be connected to an implement, stub axles connected to said axle, a steering member, and a steering connection between said steering member and said stub axles comprising a curved resilient member connected to both said steering member and said stub axles.

9. A truck for agricultural implements, comprising an axle adapted to be connected to an implement, stub axles connected to said axle, a steering member, and resilient connections between said steering member and said stub axles.

10. A truck for agricultural implements, comprising an axle adapted to be connected to an implement, stub axles connected to said axle, a steering member, and a normally rigid steering connection between said steering member and said stub axles, said steering connection being resilient in the act of turning and adapted to expand and contract under such conditions.

11. A truck for agricultural implements, comprising an axle adapted to be connected to an implement, stub axles connected to said axle, a steering member, and a steering connection between said steering member and stub axles, comprising a member formed with two curved portions, said member being connected at the junction of the two curves to the said steering member, and at the ends of the curved portions to the stub axles, said member being yielding in the act of turning.

12. A truck for agricultural implements, comprising an axle adapted to be connected to an implement, stub axles connected to said axle, a steering member, and a steering connection between said steering member and stub axles, comprising a member formed with two curved portions, and having a loop or eye connecting said curved portions, said member being connected by said loop or eye to the steering member, and at the ends of the curved portions to the stub axles, said member being yielding in the act of turning.

13. A truck for agricultural implements, comprising an axle adapted to be connected to an implement, stub axles connected to said axle, a steering member, and a steering connection between said steering member and stub axles, comprising a member formed with two curved portions, and having a loop or eye connecting said curved portions, said member being pivotally connected by means of said loop or eye to the steering member, and at the ends of the curved portions to the stub axles, said member being yielding in the act of turning.

14. A truck for agricultural implements, comprising a support adapted to be attached to an implement, an axle connected to said support, stub axles connected to said axle, a member pivotally connected to said support, and resilient steering connections between said member and said stub axles.

15. A truck for agricultural implements, comprising a support adapted to be attached to an implement, an axle connected thereto for oscillation in a vertical plane, stub axles connected to said axle, a member pivotally connected to said support, and resilient steering connections between said member and said stub axles and pivotally connected thereto.

16. A truck for agricultural implements, comprising a support adapted to be attached to an implement, an axle connected thereto for oscillation in a vertical plane, stub axles connected to said axle, a supporting bar or member pivotally connected to said support, a member secured to said supporting bar or member, and resilient steering connections between said member and said stub axles.

17. A truck for agricultural implements, comprising a support adapted to be attached to an implement, an axle connected thereto for oscillation in a vertical plane, stub axles connected to said axle, a supporting bar or member pivotally connected to said support, a block secured to said supporting bar or member, a device to which the draft means is adapted to be connected mounted on said block, a steering member connected to said block, and resilient steering connections between said steering member and said stub axles.

18. A truck for agricultural implements, comprising a support adapted to be attached to an implement, an axle connected thereto for oscillation in a vertical plane, stub axles connected to said axle, a supporting bar or member pivotally connected to said support, a block secured to said supporting bar or member, a device to which the draft means is adapted to be connected mounted on said block, said device comprising a U-shaped member placed horizontally on one leg thereof and having an intermediate bar or member secured thereto and extending between the legs of the U-shaped member, and connections between said intermediate bar or member and the horizontal legs of the U- shaped member, a steering member connected to said block, and resilient steering connections between said steering member and said stub axles.

19. A truck for agricultural implements, comprising a support adapted to be attached to an implement, an axle connected thereto for oscillation in a vertical plane, stub axles connected to said axle, a supporting bar or member pivotally connected to said support, a block secured to said supporting bar or member, a steering member pivotally connected to said block, and resilient steering connections between said steering member and said stub axles.

20. A truck for agricultural implements, comprising a support adapted to be attached to an implement, a main axle mounted therein, stub axles swiveled to said main axle, a steering member pivotally connected to said support, and a normally rigid steering connection between said steering member and said stub axles, said steering connection being resilient in the act of turning and adapted to expand and contract under such conditions.

21. A truck for agricultural implements, comprising a support adapted to be attached to an implement, a main axle mounted therein, stub axles swiveled to said main axle, a steering member pivotally connected to said support, and a resilient steering connection between said member and said stub axles.

22. A truck for agricultural implements, comprising a support, stub axles connected thereto, a steering member pivotally connected to said support, and a resilient steering connection between said member and said stub axles.

23. A truck for agricultural implements, comprising a support, stub axles connected thereto, a steering member pivotally connected to said support, and a normally rigid, steering connection between said member and said stub axles, said steering connection being resilient in the act of turning and adapted to expand and contract under such conditions.

24. A truck for agricultural implements, comprising a support adapted to be attached to an implement, a main axle mounted therein for vertical oscillation, stub axles connected thereto, a steering member connected to said support, and resilient steering connections between said steering member and said stub axles.

25. A truck for agricultural implements, comprising a support adapted to be attached to an implement, a main axle mounted therein, stub axles connected to said main axle, a steering member pivotally connected to said support, and resilient steering connections between said steering member and said stub axles.

26. A truck for agricultural implements, comprising a support adapted to be attached to an implement, a main axle mounted therein, stub axles swiveled to said main axle, a steering member pivotally connected to said support, and a resilient steering connection between said member and said stub axles, said resilient connection comprising a curved member or bar.

27. A truck for agricultural implements, comprising a support adapted to be attached to an implement, a main axle mounted therein, stub axles swiveled to said main axle, a steering member pivotally connected to said support, and a resilient steering connection between said member and said stub axles, said resilient connection comprising a member or bar formed with a double curve.

28. A truck for agricultural implements, comprising a support adapted to be attached to an implement, a main axle mounted therein, stub axles swiveled to said main axle, a steering member pivotally connected to said support, and a resilient steering connection between said steering member and said stub axles, said resilient connection comprising a member or bar formed with two curved portions connected together and being attached to the steering member by means of the connection between the two curved portions thereof and having each curved portion connected to the stub axles.

29. A truck for agricultural implements, comprising a support adapted to be attached to an implement, a main axle mounted therein, stub axles swiveled to said main axle, a steering member pivotally connected to said support, and a resilient connection between said steering member and said stub axles, comprising a member formed with two curved portions connected by means of a loop or eye, the member being pivotally connected to the steering member by means of the loop or eye, and having the outer ends of the curved portions thereof connected to said stub axles.

30. A truck for agricultural instruments, comprising a support having two downwardly extending spaced extensions, a main axle mounted therein for vertical oscillation, said axle comprising rectangular members or castings having horizontal ribs or flanges and plates or bars placed on said horizontal ribs or flanges and connected together, stub axles swiveled to said plates or bars, a steering bar or member pivotally connected to said support, a tongue mounted on said steering bar or member, and a resilient connection between said steering member and said stub axles.

31. A truck for agricultural implements, comprising a support having two downwardly extending spaced extensions, bolts connecting said spaced extensions, a main axle mounted between said spaced extensions for vertical oscillation, said axle comprising rectangular members or castings having lugs or extensions formed with bearings for one of said bolts, said rectangular members or castings also being formed with arcuate slots through which the other of said bolts passes, said rectangular members or castings also having horizontal ribs or flanges, and plates or bars placed on said horizontal ribs or flanges and connected together and held thereon by bolts, stub axles swiveled to said plates or bars, a steering bar or member pivotally connected to said support, a tongue mounted on said steering bar or member, and a resilient connection between said steering member and said stub axles.

32. A truck for agricultural implements, comprising a support adapted to be attached to an implement, a main axle mounted therein, said main axle including two bars or members spaced apart at their extremities, sleeves mounted between said spaced extremities, said sleeves having right angled projections forming stub axles and other arms or extensions, a steering member pivotally connected to said support, and a resilient connection between said steering member and said arms or extensions on said sleeves.

33. A truck for agricultural implements, comprising a support adapted to be attached to an implement, a main axle connected to said support, said main axle including two bars or members spaced apart at their extremities, bolts connecting said spaced extremities, spacing sleeves about said bolts, cylindrical members about said spacing sleeves having stub axles formed thereon and having right angled arms or extensions, a steering member pivotally connected to said support, and a resilient connection pivotally connected to said steering member and said arms or extensions.

34. A truck for agricultural implements, comprising a support adapted to be attached to an implement, an axle mounted in said support for oscillation in a vertical plane and held against oscillation or movement horizontally, a steering bar or member pivotally connected to said support and capable of movement in a horizontal plane but held against movement vertically, a tongue pivotally connected to said steering bar or member, and a resilient steering connection between said steering member and said axle.

35. A truck for agricultural implements, comprising a support adapted to be attached to an implement, an axle mounted therein for vertical oscillation but held against horizontal movement or oscillation, a steering bar or member positioned above said support, a bolt passing through said steering bar or member and said support, a spaced sleeve surrounding said bolt and preventing binding at the pivot formed by the bolt, said steering bar or member having a horizontal movement about said pivot, a tongue connected to said steering bar or member, and resilient steering connections between said steering member and said axle.

36. A truck for agricultural implements, comprising a support adapted to be attached to an implement, a main axle mounted in said support for vertical oscillation but held against horizontal movement or oscillation, stub axles pivotally connected to said main axle, a steering bar or member mounted to move horizontally about a vertical pivot and connected to said support, a tongue connected to said supporting bar or member, and resilient steering connections between said steering member and said stub axles.

37. A truck for agricultural implements, comprising a support adapted to be attached to an implement, an axle mounted therein for oscillation in a vertical plane but held against any horizontal movement or oscillation, a steering bar or member pivoted to said support so as to be capable of movement in a horizontal plane only, a tongue pivotally connected to said steering bar or member so as to be capable of movement in a vertical plane only, and resilient steering connections between said steering member and said axle.

In testimony whereof I affix my signature in presence of two witnesses.

SAMUEL B. HAZARD.

Witnesses:
CHAS. N. LA PORTE,
E. M. BARNHARDT.